United States Patent Office 3,066,176
Patented Nov. 27, 1962

3,066,176
ISOMERIZATION PROCESS
Eugene F. Schwarzenbek, Montclair, N.J., assignor to The M. W. Kellogg Company, Jersey City, N.J., a corporation of Delaware
No Drawing. Filed Dec. 21, 1956, Ser. No. 629,783
17 Claims. (Cl. 260—683.68)

This invention relates to a process for the isomerization of hydrocarbons. In one aspect, this invention relates to a process for isomerizing hydrocarbons to hydrocarbons having a higher degree of branching. In another aspect this invention relates to an improved process for isomerizing normal and branched paraffinic hydrocarbons having from 4 to 7 carbon atoms per molecule to produce more highly branched isoparaffins. In another aspect this invention relates to a new contact material.

It is known to use Friedel-Crafts type catalysts, particularly aluminum chloride, as catalytic agents for the isomerization of normal paraffinic hydrocarbons to form branched chain paraffinic hydrocarbons. These catalysts have been used in conjunction with activators, such as hydrogen chloride, thereby forming during the reaction an aluminum chloride-hydrogen chloride-hydrocarbon complex. However, during the isomerization process the complex gradually loses activity and must be discarded.

By the end of World War II, several liquid-phase processes for butane, pentane, and hexane isomerization were in commercial use. The liquid-phase processes were continuous with respect to catalyst addition and withdrawal. The reaction materials used in these plants reveal the comparative magnitude of the corrosion problems encountered in these early processes. The catalytically active solutions of aluminum chloride are highly corrosive, particularly in the presence of hydrogen chloride. In the processes employing a liquid complex as the catalyst carrier, it was necessary to use corrosion-resistant materials in the reactor lining and in other portions of the equipment where conditions of temperature, turbulence and hydrogen chloride concentration would contribute to high corrosion rates.

The principal differences between the butane and pentane isomerization processes were the use of somewhat milder conditions for pentane isomerization, and the use of inhibitors to suppress side reactions, principally disproportionation. To inhibit side reactions, a hydrogen partial pressure of 60 to 70 pounds per square inch was maintained, largely by recycle. Catalyst life was much shorter than in the butane process with only about 30 to about 50 gallons of isopentane produced per pound of catalyst.

An increasingly critical problem for refiners today is upgrading light naphtha, which contains butanes, pentanes, hexanes and heptanes to a high octane number level so that this material may be included in premium gasolines. As the octane number of motor gasoline increases, the virgin light naphtha becomes less valuable as a gasoline component.

An object of this invention is to provide an isomerization process.

Another object is to provide a method to effect conversions of butane, pentane, hexane, and heptane hydrocarbons in good selectivity so as to produce predominately isobutane, isopentane, and more highly branched hexanes and heptanes which may be used directly as a blending agent for motor fuels.

Another object of this invention is to effect conversions of hydrocarbon mixtures comprising $C_5$ and $C_6$ hydrocarbons in good selectivity to produce isomeric compounds thereof which may be used directly as a blending agent for motor fuels.

Another object of this invention is to provide an improved process for the isomerization of normal pentane.

Still another object of this invention is to provide an improved process for isomerizing hexane such as normal hexane and methyl pentanes to higher branched hexanes.

A further object of this invention is to provide a continuous process for increasing the degree of branching of paraffinic hydrocarbons under conditions whereby the catalyst maintains its activity over an extended period of time.

A further object of this invention is to provide a new contact material.

A still further object of this invention is to provide a new and improved catalyst which is effective for hydroisomerization of a hydrocarbon feed rich in $C_5$ paraffins, and which avoids excessive degradation of the feed to hydrocarbons having fewer carbon atoms.

A still further object of this invention is to provide a new and improved catalyst which is effective for hydroisomerization of a hydrocarbon feed rich in $C_6$ paraffins, and which avoids excessive degradation of the feed to hydrocarbons having fewer carbon atoms.

A still further object is to provide a method of preparation of a catalyst having the above-mentioned characteristics.

Various other objects and advantages of this invention will become apparent to those skilled in the art from the accompanying description and disclosure.

According to the process of the present invention, an isomerizable hydrocarbon is contacted under isomerization conditions with a solid catalytic material comprising a group VIII metal having an atomic number of at least 44, an inorganic carrier material and containing substantially not lower than about 10 percent by weight of fluorine. For example, in accordance with the process of this invention, an isomerizable hydrocarbon fraction is isomerized when contacted with a solid catalyst comprising alumina, between about 0.01 percent and about 10 percent by weight of one of the aforesaid group VIII metals such as, for example, platinum, palladium and rhodium and containing substantially not lower than about 10 weight percent of combined fluorine at a temperature below 1000° F. Among the substances which can be isomerized in accordance with this invention, paraffinic hydrocarbons such as those containing from 4 to 7 carbon atoms per molecule, and naphthenes are the most significant from a commercial standpoint. The catalysts of this invention are particularly effective for the conversion of $C_5$ and $C_6$ paraffinic hydrocarbons either singly or in mixture with each other, as well as a hydrocarbon stream which contains a major proportion of either of such hydrocarbons, or a hydrocarbon stream in which the major proportion is the sum of such hydrocarbons, to hydrocarbons having a higher degree of branching. The aforesaid hydrocarbon stream containing a major proportion of either $C_5$ or $C_6$ hydrocarbons and the aforesaid hydrocarbon stream in which the major proportion is the sum of $C_5$ and $C_6$ hydrocarbons, are considered to be rich in such hydrocarbons. In accordance with this invention n-pentane is converted to isopentane; n-hexane is converted to isohexanes such as 2-methyl pentane and 3-methyl pentane; and methyl pentanes are converted to dimethyl butanes such as 2,2-dimethyl butane and 2,3-dimethyl butane. Also included within the scope of this invention is the isomerization of butane and heptanes to more highly branched compounds. The isomerization of such hydrocarbons to their isomers is accomplished by the use of the presently described catalyst comprising one of the aforesaid group VIII metals on alumina and promoted with combined fluorine in an amount generally of at least 10 weight percent, without the disadvantages of the prior art such as corrosion of equipment, low conversion rates per pound of catalyst, and the problems associated with handling and renewing the activity of the catalyst employed.

In accordance with one embodiment of this invention a stream rich in straight chain paraffins or paraffins having a low degree of branching such as methyl pentane, for example, is brought into contact with a contact material comprising a group VIII metal having an atomic number of at least 45 and having a face-centered cubic structure, on alumina and promoted with at least 12 weight percent of combined fluorine in the presence of added hydrogen under isomerizing conditions such that paraffins having a higher degree of branching are produced in good yield and selectivity. The presence of hydrogen during the isomerization reaction of this invention is preferred since the presence of hydrogen prolongs the life of the catalyst and minimizes carbon formation. When the hydrocarbon feed or stock material is subjected to the hereindescribed isomerization conditions, the reaction zone effluent is fractionated, unconverted paraffins or a portion thereof, are recycled to the reaction zone as desired, and the isomeric product is recovered and is used as a blending agent for gasoline products.

To effect the isomerization reactions employing the catalyst comprising a group VIII metal having an atomic number of at least 44 in accordance with this invention, the conditions of operation may be varied rather widely. Thus temperatures of about 300° F. to about 1000° F. may be suitably employed, and usually a temperature range falling between about 500° F. and about 850° F. is employed. Within these temperature limits weight space velocities of about 0.1 to about 30 pounds of hydrocarbon feed per hour per pound of catalyst may be employed, however, space velocities within the range of about 0.5 to about 15 generally give the best results. Hydrogen should be introduced into the reaction zone at a ratio of from about 200 to about 10,000 s.c.f.b. (standard cubic feet per barrel) and preferably at a rate of from about 1000 to about 6000 s.c.f.b., or the hydrogen to hydrocarbon mol ratio may fall within the range from about 0.1 to about 10, and preferably from about 1 to about 8 moles of hydrogen per mol of hydrocarbon. The total reaction pressure may be maintained at any value between about 0 pounds per square inch gauge (p.s.i.g.) and about 900 p.s.i.g. Although satisfactory results are obtained at substantially atmospheric pressure or lower, a pressure between about 200 and about 800 p.s.i.g. is usually preferred. It is desirable that the hydrogen partial pressure be carefully controlled to effect the desired conversion while maintaining the activity of the catalyst and minimizing coke deposition thereon.

The optimum operation conditions to be used in any one isomerization reaction depends to a large extent upon the nature and composition of the hydrocarbon stock or feed material. Thus, for example, when a fraction rich in normal pentane is isomerized in the presence of the catalysts of this invention, the particularly preferred operating conditions are as follows: a temperature within the range from about 550° F. to about 850° F.; a weight space velocity of about 1 to about 10 pounds of hydrocarbon feed per hour per pound of catalyst; a hydrogen to hydrocarbon mol ratio within the range from about 1 to about 5; and a total reaction pressure between about 200 and about 600 p.s.i.g. When a fraction rich in normal hexane is isomerized in the presence of the catalysts of this invention, the optimum operating conditions are as follows: a temperature within the range from about 500° F. to about 800° F.; a weight space velocity of about 2 to about 15 pounds of hydrocarbon feed per hour per pound of catalyst; a hydrogen to hydrocarbon mol ratio within the range from about 2 to about 7; and a total reaction pressure between about 300 and about 800 p.s.i.g. When isomerizing a hydrocarbon fraction rich in $C_4$ hydrocarbons, higher temperatures such as from about 650° F. to about 1000° F. are usually employed. Generally more severe operating conditions are employed when isomerizing n-pentane than when isomerizing n-hexane, and similarly more severe conditions are employed when isomerizing n-butane than when isomerizing n-pentane, all other factors being equal. When employing the catalysts of this invention having a fluorine content of at least 12 weight percent, to effect isomerization of the aforesaid hydrocarbons, best conversions per pass are usually obtained at a relatively low temperature, i.e., a temperature between about 500° F. and about 700° F. or 750° F.

As indicated above, the isomerization process of the present invention may be applied to pure or substantially pure n-pentane or hexane or to a n-pentane, hexane containing mixture. Thus, the process of this invention provides a means for upgrading light naphtha and particularly the isomerization of pentanes, hexanes, or mixtures thereof to their isomers. The CFRR clear research octane numbers of n-pentane and n-hexane are 61.7 and 24.8, respectively, while the leaded octane numbers (3 cc. TEL) of n-pentane and n-hexane are 92.3 and 65.2, respectively. The CFRR clear octane number of isopentane, 2-methyl pentane, 3-methyl pentane, 2,2-dimethyl butane and 2,3-dimethyl butane are respectively 88.7; 73.4; 74.5; 91.8; and 103.5 (Weise scale) while the leaded octane numbers (3 cc. TEL) are respectively 105.7; 93.1; 93.4; 106; and 110 (approximately). Thus, considerable octane improvement can be achieved by the isomerization process of the present invention without the disadvantages of aluminum chloride-hydrocarbon complex of the prior art processes.

In accordance with the isomerization process of the present invention, the aforesaid hydrocarbons are in large part converted to corresponding higher branched isomers with substantially no loss of either the treated hydrocarbon or the resultant isomer due to the occurrence of undesirable side reactions such as polymerization, cracking, hydrocracking, etc. The process of the present invention is selective as regards the isomerization reaction in the presence of the catalyst hereindescribed and under the conditions of execution of the process. Furthermore, the process of this invention provides a system wherein loss of catalyst activity and selectivity is reduced to a minimum and the catalyst has a long useful life.

The catalyst used in accordance with the process of the present invention comprises alumina containing at least 0.01 percent by weight of a group VIII metal of atomic number of at least 44 promoted with combined fluorine generally in an amount from about 10 to about 22 percent by weight of combined fluorine. Best results are realized when the catalyst composite contains between about 12 and about 20 weight percent of combined fluorine. The particularly preferred content of fluorine ranges between about 12 and about 18 weight percent.

As indicated above, the catalysts of this invention comprise a group VIII metal having an atomic number of at least 44 and include ruthenium, rhodium, palladium, osmium, iridium and platinum. Of these metals those having a face-centered cubic crystalline structure, that is, rhodium, palladium, iridium and platinum usually possess the best combination of activity and selectivity as compared to that of the metals having a hexagonal crystalline structure, that is, ruthenium and osmium. The amount of the aforesaid group VIII metal incorporated in the catalyst generally falls within the range from about 0.01 to about 10 percent by weight, small amounts of the metal being preferred because of cost, with the preferred range being between about 0.02 percent and about 2 percent by weight. The particularly preferred concentration of the group VIII metal ranges between about 0.05 percent and about 1 percent by weight.

The inorganic carrier material used as the support for the catalysts of this invention, is preferably a high surface area support such as alumina, silica, magnesia, zirconia, thoria, gallia, etc., and combinations thereof such as alumina-silica, silica-magnesia, silica-zirconia, silica-alumina-zirconia, alumina-gallia, acid washed silica-alumina clays, etc. The various forms of such materials that are capable of adsorbing gases on their surface and which have been found to be useful in catalyst compositions for hydrocarbon conversion reactions may be used as the support for the metal.

In view of the temperatures encountered in the isomerization reactions of this invention and in the regeneration of the hereindescribed catalysts, a refractory substance is recommended as the adsorptive carrier material and, of such materials, alumina is preferred. In this category are the aluminas derived from the synthetic alumina hydrates known as gibbsite, bayerite and boehmite. The alumina base is preferably one having gamma and eta modifications. It is desirable that the alumina base has a large pore and large area structure. This base is formed by dehydration of hydrated alumina in which alumina trihydrates predominate. The conversion of the alumina to the desired precursor alumina system may be effected in various ways. One suitable method involves aging an alumina gel which is maintained at a pH of about 8 to 10 for a period of several days. Another method involves seeding the gel in the preparation process with crystallites of gibbsite, for example. The transition to the desired phase system in which the crystalline trihydrate forms of alumina predominate may be roughly controlled with experience by visual observation.

Synthetic alumina gels may be prepared by precipitating a solution of alumina salt such as aluminum chloride or sulfate with ammonium hydroxide to form a gelatinous precipitate. The resultant precipitate is then worked free of chloride or sulfate ion. Alternatively, highly active alumina gels may be prepared by hydrolysis of an aluminum alkoxide. The resultant precipitate may be peptized by addition of a weak acid such as acetic acid to convert the precipitate to a gel. Silicon compounds may be introduced in a number of ways in forming silica-alumina such as the addition of silicon tetrachloride to the soluble aluminum salt prior to precipitation with ammonia.

The operations involved in preparing the preferred catalysts of this invention, include the following steps: forming an alumina gel; converting the alumina gel to a form in which the trihydrate alumina phase predominates; incorporating the group VIII metal bearing component; and incorporating the fluorine usually in the form of ammonium fluoride or a hydrofluoric acid solution; drying the slurry; and treating the dried product at elevated temperatures so as to substantially convert the group VIII bearing component to the metal or other active phase. The treatment of the dried catalyst mass may be accomplished by calcining at a temperature between about 800° F. and about 1200° F. for a period from about 2 to about 6 hours, for example, in the presence of air, oxygen, or nitrogen. Alternatively, active catalysts are prepared by treating the dried catalyst mass in the presence of hydrogen under conditions that minimize thermal decomposition of the metal bearing compound. Generally, this treatment of the catalyst with hydrogen is carried out at atmospheric pressure at a temperature between about 400° F. and about 900° F. for a period of time between about 1 and about 10 hours. It is to be understood that the dried catalyst may be calcined and then treated with hydrogen, or the calcination step may be omitted and the dried catalyst treated directly with hydrogen under the aforesaid conditions.

Generally, the group VIII metal such as platinum, for example, is added to the catalyst preparation zone in the form of a solution of the metal-bearing compound using a solvent such as water or certain oxygenated organic compounds such as hydroxylated organic compounds (e.g., methanol, glycerol, isoamyl alcohol); a carboxylic acid (e.g., formic acid); or a ketone (e.g., acetone). Thus, any platinum, rhodium, palladium, iridium, ruthenium and osmium bearing compound which is soluble in one of the aforesaid solvents, of which water is preferred, may be used. Typical examples of such metal bearing compounds which are suitable are platinic chloride, ruthenium chloride, iridium chloride, palladium chloride, rhodium chloride, rhodium nitrate, etc., and various complex salts such as rhodium amine chloride salts. The amount of this solution which is utilized is controlled so that the final catalyst contains the metal within the aforesaid concentration.

The catalysts of the present invention may be prepared in a variety of methods and by various orders of addition of the different components. One suitable method, for example, is to add platinum in the form of a water soluble compound such as platinum chloride to an alumina gel of the type described above. Another method comprises sulfiding the solution of the group VIII metal salt by reaction with, for example, ammonium sulfide or hydrogen sulfide before addition to the alumina. The metal containing gel may then be dried at a temperature between about 200° F. and about 275° F. followed by calcination and/or treatment with hydrogen. Alternatively the metal bearing compound may be added to the dry gel and the mass then calcined or dried with hydrogen at an elevated temperature. The fluorine may be incorporated into the metal containing gel either before or after calcination of the dried gel. Thus, for example, a platinum-alumina mass, for example, may be calcined or treated with hydrogen and then soaked in a solution of hydrofluoric acid followed by drying and calcining. The fluorine in the form of hydrofluoric acid may be added instead to the dried uncalcined group VIII metal-alumina mass followed by drying and calcining of the composite mass. Alternatively the alumina gel may be added to the dried fluorided metal composite.

As is evident from the above examples, a number of alternative procedures are available for the preparation of active catalysts of this invention. The group VIII metal such as platinum and palladium may be added to peptized gel to dried gel or to calcined gel. Combined fluorine may be added at any stage, the particular choice being determined by a large number of factors including cost, the purpose for which catalyst is being prepared, components selected for use in preparation, etc.

The catalysts of the present invention may also be prepared by employing an activator and a solution or dispersion of the metal bearing substance mixed with the carrier. Upon heating, the metal is fixed on the supporting material while the activating substance or reaction products thereof may remain in the final catalyst in certain instances, but preferably this is volatilizable matter, that is, matter which evaporates or decomposes at or below either the temperature at which the catalyst is calcined or the operating temperature at which the catalyst is maintained during conversion or regeneration reactions, these temperatures usually being less than about 1200° F.

The activator employed in preparing the catalysts may be an inorganic or organic compound of mercury, zinc and cadmium, which includes a variety of classes, such as for example, oxides, hydroxides and inorganic salts, salts of aliphatic and aromatic carboxylic acids, aliphatic and aromatic sulfur acids, as well as aliphatic and aromatic phosphorous acids, etc. Particularly useful compounds of mercury, zinc and cadmium are the aliphatic carboxylate salts such as those derived from the fatty acids, carbonic acids, thiocarbonic acids, etc. Specific examples of promoter salts of the aliphatic carboxylic acids are the monobasic types, such as for example, mercurous acetate, mercuric propionate, mercuric butyrate, mercuric valerate, zinc acetate, zinc formate, zinc caproate, cadmium acetate, cadmium propionate, cadmium heptonate, mercury ethyl carbamate, mercury propyl carbamate, zinc butyl carbamate, cadmium amyl carbamate, mercury ethyl xanthate, zinc propyl xanthate, cadmium butyl xanthate, etc. The aliphatic polycarboxylic acids can also be used. Useful mercury, zinc and cadmium salts of aromatic carboxylic acids can be of the mono- or polybasic type. Examples of such salts are mercurous benzoate, zinc benzoate, cadmium benzoate, mercuric phthalate, zinc phthalate, cadmium phthalate, mercurous salicylate, zinc salicylate, cadmium salicylate, etc.

For a further understanding of the nature and objects of this invention, reference should be had to the following examples which are set-forth as typical and illustrative examples and are not to be construed as unnecessarily limiting to the present invention.

EXAMPLE 1

This example illustrates the preparation of a catalyst comprising a group VIII metal having an atomic number of at least 44 on alumina and containing about 17.4 percent of combined fluorine.

(A) The rhodium-alumina composite used to prepare the catalyst of this example is prepared by the following procedure:

Aluminum chloride hexahydrate is dissolved in deionized water. While vigorously stirring the aluminum chloride solution, a solution of ammonium hydroxide is added, the precipitation of alumina hydrates being completed at a pH of about 8.0. The precipitate which forms is then filtered from the mother liquor. The filtered cake is dispersed in deionized water and the alumina hydrogel is washed by repeated filtering and reslurrying of the filtered material with a pH adjustment to 8 before filtering. The alumina hydrate is aged at or near room temperature for a period of about 14 days. The aged hydrate is washed several times with deionized water and a slurry is made thereof. A slurry prepared in a manner similar to that described above is stirred vigorously while an aqueous solution of rhodium chloride in deionized water is added. The amount of rhodium chloride added is sufficient to yield a resultant catalyst containing 0.5 percent by weight of rhodium on alumina. The slurry of rhodium chloride and alumina is stirred and is then placed in heat resistant trays and dried at 230° F. for several days in the presence of air. The oven dried product is ground and formed into tablets which are calcined at a temperature of about 930° F. in the presence of air for 3 hours.

(B) 75 grams of 0.5 percent rhodium on alumina prepared in accordance with part (A) of this example were added to 20.4 grams of a 50 percent solution of hydrofluoric acid. Additional water was added to thoroughly wet the rhodium-alumina mass. The hydrofluoric acid impregnated rhodium-alumina composite was then dried at 230° F. in an oven for 19 hours followed by calcining at 1000° F. for 2 hours in the presence of air. The resultant fluorided rhodium-alumina composite was then treated with another 20.4 grams of a 50 percent hydrofluoric acid solution followed by drying and calcining under the aforesaid conditions. The calcined composite, after the two treatments with hydrofluoric acid, was found to contain 0.5 percent rhodium, 17.4 percent by weight fluorine, the remaining component being essentially alumina.

EXAMPLE 2

The catalyst containing 0.5 weight percent rhodium, 17.4 weight percent of combined fluorine on alumina prepared in accordance with Example 1 above, was tested for its activity and selectivity for the isomerization of normal pentane. The isomerization reaction of this example was carried out in a stainless steel isothermal reactor 7 inches in length, and having a ½ inch inner diameter 5 inches deep at one end, and a ⅜ inch inner diameter 2 inches deep from the other end. The ledge where these two holes meet marks the bottom of the catalyst bed which is 2 inches from the bottom of the reactor. A thermocouple well 2¼ inches deep is drilled from the bottom of the reactor 1/16 of an inch from the interior wall of the catalyst bed. This reactor is then wrapped with asbestos and wire for heating. After the reactor is heated to the desired temperature the hydrocarbon feed is injected into the system. The feed is swept into the system by a flow of hydrogen carrier gas that is allowed to flow through the system constantly. The feed is carried through the reactor where it comes in contact with the fixed bed of catalyst, and resulting products are then carried through a chromatographic column where the product is separated into its components which are then identified.

One gram of rhodium catalyst prepared in accordance with Example 1 above was thoroughly mixed with alundun and placed in the above described reactor. Alundum was placed over the catalyst bed as a preheat zone. A stream of hydrogen gas was then introduced into the reactor and the reactor was brought to the test conditions shown in Table I below. When test conditions were reached normal pentane of 99.9 percent purity was injected into the hydrogen stream. This feed was carried through the reactor where it was preheated by the alundum and carried through the hot catalyst bed. The isomerization conditions and results of this experiment are recorded in the following Table I.

*Table I*

ISOMERIZATION OF n-PENTANE

| Example No. | 2 |
|---|---|
| Catalyst composition | 0.5 wt. percent Rh—alumina—17.4 wt. percent F |
| Charge catalyst, gms | 1 |
| Pressure, p.s.i.g | 6.3 |
| Temperature, °F | 654 |
| Contact time, seconds | 2 |
| Yields, Output Mol percent: | |
| $C_1$–$C_4$ | 5.6 |
| i-pentane | 56.6 |
| n-pentane | 37.8 |
| n-pentane conversion (single pass) | 62.2 |
| $iC_5/nC_5$ Product | 1.50 |
| $iC_5/nC_5$ Feed | .006 |

EXAMPLE 3

This example illustrates the preparation of a catalyst comprising a group VIII metal having an atomic number of at least 44 on alumina and containing 12.7 percent by weight of combined fluorine.

76 grams of alumina containing 0.58 percent by weight platinum was placed in a platinum crucible and impregnated with 22.3 grams of 49% hydrofluoric acid diluted with 45 ml. of distilled water. The crucible was placed in an oven at 220° F. for 1.5 hours with occasional stirring. Two more batches of 0.58 weight percent platinum-alumina were treated in the same manner giving a total of 227.6 grams of catalyst composite. The 3 portions were combined and calcined for 2 hours at 1000° F. Analysis of the calcined catalyst showed it to contain 7.4% by weight of combined fluorine. The 227.6 grams of catalyst were divided into 3 equal portions, each of which was impregnated with 7.1 grams of 49% hydrofluoric acid diluted with approximately 40 ml. of distilled water. The catalyst batches were dried at 60° C., then they were calcined for 2 hours at 1000° F. Analysis of the combined batches showed a fluorine content of 8.93 weight percent. The catalyst mass (227.6 grams) was divided into 3 equal portions again, and each portion was impregnated with 18.4 grams of 49 percent by weight of hydrofluoric acid diluted with approximately 40 ml. of water. The slurry was then dried at 60° C. and calcined for 2 hours at 1000° F. Analysis of the resultant catalyst showed it to contain 0.58 percent by weight platinum, 12.73 percent by weight fluorine, the remaining constituent being alumina.

EXAMPLE 4

The procedure of this example was conducted employing a one inch inner diameter downflow isothermal reactor charged with a given quantity of catalyst spaced with Alundum (8–12 mesh). In each run the catalyst temperature was raised to 1000° F. (100° F./hour) with 2 standard cubic feet per hour (s.c.f.h.) of nitrogen flowing at atmospheric pressure and held at this temperature for 4 hours while continuing the flow of nitrogen. The temperature was then dropped to about 750° F. with nitrogen flowing and the pressure raised to the desired value (i.e., 300 p.s.i.g.) with hydrogen. The system was purged of nitrogen by pressuring and depressurizing the system approximately three times in the presence of hydrogen. The test unit was then held at the desired temperature and pressure while normal pentane was cut in. The operating conditions, catalyst employed and results of this experiment are recorded in the following Table II.

*Table II*

ISOMERIZATION OF n-PENTANE

| | |
|---|---|
| Example No. | 4 |
| Catalyst Composition | 12.7 wt. Percent F—0.58 wt. Percent Pt—alumina |
| Catalyst charge, grams | 50 |
| Hours on Oil, End of Run | 16 |
| Pressure, p.s.i.g. | 300 |
| Temperature, °F | 750 |
| WHSV, lb./hr./lb. | 1.975 |
| $H_2/HC$, m./m. | 3.14 |
| Gas Recycle Ratio m./m. | 2.92 |
| Length of Run, hr. | 8 |
| Weight Balance, Precent (Input basis) | 97.5 |
| Yields, Output Basis Wt. Percent: | |
| $H_2$ | —0.04 |
| $C_1$ | 0.08 |
| $C_2$ | 0.22 |
| $C_3$ | 0.27 |
| $C_4$ | 0.15 |
| n-pentane | 45.96 |
| i-pentane | 53.08 |
| Aromatics | 0.28 |
| $C_1$-$C_4$ Yield, Wt. Percent | 0.72 |
| Other $C_5$+ Liquid Yield, Wt. Percent | 0.28 |
| Total $C_5$+ Liquid Yield, Wt. Percent | 99.32 |
| Wt. Percent Conversion of n-$C_5$ | 53.8 |
| Wt. Percent Ultimate Yield of i-$C_5$ | 98.1 |
| Wt. Percent Ultimate Yield of other $C_5$+ Liquid | 0.52 |
| Wt. Percent Ultimate Yield of $C_1$-$C_4$ | 1.33 |
| i-$C_5$/n-$C_5$ in Product, Wt. Percent | 1.155 |
| i-$C_5$/n-$C_5$ in Feed, Wt. Percent | 0.0050 |
| i-$C_5$/n-$C_5$ at Equilibrium, Wt. Percent | 2.1800 |

It is to be understood that when a substantially pure feed of n-hexane is used in the above Examples 2 and 4 in place of the n-pentane feed and the isomerization is carried out in a manner similar to that of the above examples, substantial yields of higher branched hexanes are obtained as the product of the process. Similarly when a mixed feed comprising n-pentane and hexane is isomerized in accordance with the above examples, substantial yields of corresponding more highly branched isomers are obtained with relatively low gas formation resulting from cracking. Similarly when a hydrocarbon fraction comprising n-butane and heptane either alone or in mixture with each other, or in mixture with $C_5$ and $C_6$ paraffins, is brought into contact with the catalysts of this invention under the conditions described hereinabove, more highly branched isomers thereof are obtained in good yields and selectivity. The other catalysts of this invention, i.e., those comprising palladium, iridium, ruthenium and osmium are prepared in a manner similar to the procedures of the above Examples 1 and 3 by treating the appropriate metal-alumina mass with hydrofluoric acid as hereindescribed, and exhibit good activity and selectivity for the isomerization of n-pentane, n-hexane, etc. to higher branched isomers when employed for example, under conditions similar to those of Examples 2 and 4 above.

Although tests were carried out with a fixed bed of catalyst pellets, the isomerization catalyst of the present invention may be effectively employed as pills, extrusions, lumps, in a granular or in powdered state, and these may be used in both fluidized systems and those employing moving beds of contact material in either concurrent or countercurrent flow relative to the reactants.

Regeneration of the partially deactivated catalyst of the present invention may be successfully accomplished by combustion in a stream of oxygen containing gas such as air or pure oxygen which may or may not be diluted with flue gas, nitrogen or other inert gases. For example the oxygen containing gas employed can be diluted a sufficient amount to provide a low oxygen content in the range of from about 0.1 to about 3 percent when first contacting the catalyst for regeneration at a temperature between about 500° F. and about 900° F. During the first step of the regeneration, the hydrogen contained in the catalyst is burned, the time required depending upon the quantity of catalyst employed. Then the temperature is raised sufficiently, usually to about 800° F., to initiate burning of the carbonaceous deposits in the catalyst. During the carbon burn state the oxygen content of the regeneration gas is gradually increased by periodically decreasing the amount of inert gases added thereto while gradually increasing the temperature to about 1000° F.

Since certain changes may be made in the method of preparing the catalyst and in the processes described without departing from the scope of the invention, it is intended that all matter contained in the above description shall be interpreted as illustrative and not in a limiting sense.

Having described my invention, I claim:

1. A process for isomerizing an isomerizable paraffinic hydrocarbon which comprises contacting said hydrocarbon under isomerizing conditions with a catalyst comprising combined fluorine in an amount of at least about 12 percent by weight, alumina, and a group VIII metal having a face-centered cubic crystalline structure and an atomic number of at least 45.

2. A process for isomerizing an isomerizable paraffinic hydrocarbon which comprises contacting said hydrocarbon under isomerizing conditions with a catalyst comprising combined fluorine in an amount of at least about 12 percent by weight, alumina and a group VIII metal of hexagonal crystalline form and having an atomic number of at least 44.

3. A process for isomerizing a hydrocarbon fraction comprising an isomerizable hydrocarbon having from 4 to 7 carbon atoms per molecule which comprises contacting said hydrocarbon fraction at a temperature between about 300° F. and about 1000° F. in the presence of added hydrogen with a catalyst comprising alumina, platinum and at least 12 percent by weight combined fluorine.

4. A process for isomerizing a hydrocarbon fraction comprising $C_5$ and $C_6$ paraffins which comprises contacting said hydrocarbon fraction under isomerizing conditions with a catalyst comprising an inorganic carrier material, platinum and combined fluorine in an amount between about 12 and about 20 percent by weight.

5. A process for isomerizing a hydrocarbon fraction rich in at least one member of the group consisting of $C_5$ and $C_6$ paraffins which comprises contacting said hydrocarbon fraction under isomerizing conditions at a temperature between about 500° F. and about 750° F. with a catalyst comprising alumina, from about 0.01 percent to about 10 percent by weight platinum, and at least about 12 percent by weight of combined fluorine.

6. A process for isomerizing a hydrocarbon fraction comprising $C_5$ hydrocarbons which comprises contacting said hydrocarbon fraction under isomerizing conditions with a catalyst comprising an inorganic carrier material, platinum, and combined fluorine in an amount between about 12 and about 20 percent by weight.

7. A process for isomerizing a hydrocarbon fraction comprising $C_5$ hydrocarbons which comprises contacting said hydrocarbon fraction under isomerizing conditions including a temperature between about 300° F. and about 750° F. in the presence of added hydrogen with a catalyst comprising alumina, platinum, and combined fluorine in an amount between about 12 and about 18 percent by weight.

8. A process for isomerizing a hydrocarbon fraction comprising $C_6$ hydrocarbons which comprises contacting said hydrocarbon fraction under isomerizing conditions with a catalyst comprising an inorganic carrier material, platinum, and combined fluorine in an amount between about 12 and about 20 percent by weight.

9. A process for isomerizing a hydrocarbon fraction comprising $C_6$ hydrocarbons which comprises contacting said hydrocarbon fraction under isomerizing conditions including a temperature between about 300° F. and about 750° F. in the presence of added hydrogen with a catalyst comprising alumina, platinum, and combined fluorine in an amount between about 12 and about 18 weight percent.

10. A process for isomerizing a hydrocarbon fraction comprising $C_5$ and $C_6$ hydrocarbons in the presence of added hydrogen under isomerizing conditions with a catalyst comprising alumina, a group VIII metal having an atomic number of at least 44, and substantially not lower than about 12 percent by weight of combined fluorine.

11. A process for isomerizing a hydrocarbon fraction rich in $C_5$ hydrocarbons which comprises contacting said hydrocarbon fraction in the presence of added hydrogen, at a temperature between about 500° F. and about 750° F. with a catalyst comprising alumina, between about 0.02 and about 2 percent by weight platinum, and at least 12 weight percent of combined fluorine.

12. A catalyst comprising an inorganic carrier material, from about 0.01 percent to about 10 percent by weight of a group VIII metal having an atomic number of at least 45, and a face-centered cubic crystalline structure, and between about 12 percent and about 22 percent by weight of combined fluorine.

13. A catalyst comprising alumina, platinum, and between about 12 percent and about 18 percent by weight of combined fluorine.

14. A catalyst comprising alumina, platinum in an amount of from about 0.02 percent to about 2 percent by weight, and from about 12 percent to about 18 percent by weight of combined fluorine.

15. A process which comprises contacting normal pentane in the presence of added hydrogen at a temperature between about 300° F. and about 850° F. with a catalyst comprising alumina, platinum and combined fluorine in an amount of about 12 weight percent such that conversion of normal pentane to isopentane is the predominant reaction.

16. The process of claim 1 in which said group VIII metal is rhodium.

17. The catalyst composition of claim 12 in which said group VIII metal is rhodium.

References Cited in the file of this patent

UNITED STATES PATENTS

| | | |
|---|---|---|
| 2,693,829 | Haensel | Jan. 4, 1955 |
| 2,766,302 | Elkins | Oct. 9, 1956 |
| 2,777,805 | Lefrancois et al. | Jan. 15, 1957 |
| 2,798,105 | Heinemann et al. | July 2, 1957 |
| 2,831,908 | Starnes et al. | Apr. 22, 1958 |
| 2,834,823 | Patton et al. | May 13, 1958 |
| 2,841,626 | Holzman et al. | July 1, 1958 |

UNITED STATES PATENT OFFICE
CERTIFICATE OF CORRECTION

Patent No. 3,066,176 November 27, 1962

Eugene F. Schwarzenbek

It is hereby certified that error appears in the above numbered patent requiring correction and that the said Letters Patent should read as corrected below.

Column 3, line 48, for "operation" read -- operating --; column 6, line 71, for "heptonate" read -- heptanoate --; column 8, lines 14 and 15, for "alundun" read -- alundum --; column 9, "Table II" first column, line 12 thereof, for "Precent" read -- Percent --; column 10, line 49, for "weight combined" read -- weight of combined --; column 12, line 27, for "2,693,829" read -- 2,698,829 --.

Signed and sealed this 2nd day of April 1963.

(SEAL)
Attest:

ESTON G. JOHNSON

Attesting Officer

DAVID L. LADD

Commissioner of Patents